(12) United States Patent
Wakayama et al.

(10) Patent No.: US 8,892,323 B2
(45) Date of Patent: Nov. 18, 2014

(54) CONTROL DEVICE AND METHOD FOR STEPPED TRANSMISSION ENSURING SMOOTH TRANSITION IN ENGINE IDLE STOP AND RESUMPTION CYCLE

(75) Inventors: Hideshi Wakayama, Hadano (JP); Keichi Tatewaki, Atsugi (JP); Hiroshi Sekiya, Atsugu (JP); Koutarou Tagami, Yokohama (JP); Seiichiro Takahashi, Isehara (JP); Yuzuru Tohta, Sagamihara (JP); Takashi Matsuda, Isehara (JP); Daisuke Matsumoto, Sagamihara (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 34 days.

(21) Appl. No.: 13/576,267

(22) PCT Filed: Jan. 17, 2011

(86) PCT No.: PCT/JP2011/050674
§ 371 (c)(1),
(2), (4) Date: Jul. 31, 2012

(87) PCT Pub. No.: WO2011/111417
PCT Pub. Date: Sep. 15, 2011

(65) Prior Publication Data
US 2012/0298462 A1 Nov. 29, 2012

(30) Foreign Application Priority Data
Mar. 9, 2010 (JP) ................................. 2010-052374

(51) Int. Cl.
*F16H 61/00* (2006.01)
*F16H 61/20* (2006.01)
*F16H 61/06* (2006.01)
*F16H 59/66* (2006.01)

(52) U.S. Cl.
CPC .............. *F16H 61/061* (2013.01); *F16H 61/20* (2013.01); *F16H 2059/663* (2013.01); *F16H 2061/205* (2013.01); *B60Y 2300/18016* (2013.01); *F16H 2312/14* (2013.01)
USPC .................. 701/67; 701/54; 701/55; 477/77; 477/115; 477/116; 477/117

(58) Field of Classification Search
CPC .......... F16H 2312/02; F16H 2312/022; F16H 2312/13; F16H 2306/42; F16H 2306/54; F16H 61/061; F16H 61/20; F16H 2061/205
USPC ............. 701/54, 55, 67; 477/48, 77, 115–117
See application file for complete search history.

(56) References Cited

U.S. PATENT DOCUMENTS 5,704,873 A * 1/1998 Iwata et al. .................... 477/115
6,338,695 B1 * 1/2002 Aoki et al. ........................ 477/48
(Continued)

FOREIGN PATENT DOCUMENTS

EP 0 810 115 A2 12/1997
JP 03-123153 U 12/1991
(Continued)

*Primary Examiner* — Helal A Algahaim
*Assistant Examiner* — Donald J Wallace
(74) *Attorney, Agent, or Firm* — Foley & Lardner LLP

(57) ABSTRACT

A control device controls a transmission mechanism which includes a first clutch to be engaged at startup and a second clutch, and is interlocked when hydraulic pressure is supplied to the first and second clutches and when the first and second clutches are completely engaged. The control device includes a hydraulic pressure control unit controlling hydraulic pressure supplied to the transmission mechanism so that the first clutch is set in a completely engaged state and the second clutch is set in a slip interlock state where the second clutch is not completely engaged in the case of a return from an idle stop control in which an engine is automatically stopped. The hydraulic pressure control unit starts reducing hydraulic pressure supplied to the second clutch when an increased amount of an engine rotation speed per unit time becomes smaller than a predetermined value.

12 Claims, 14 Drawing Sheets

(56) References Cited

U.S. PATENT DOCUMENTS

| | | | |
|---|---|---|---|
| 6,589,134 B2* | 7/2003 | Williams et al. | 477/99 |
| 6,736,755 B2* | 5/2004 | Kato | 477/117 |
| 7,089,095 B2* | 8/2006 | Takami et al. | 701/54 |
| 7,335,133 B2* | 2/2008 | Katou et al. | 701/67 |
| 7,996,139 B2* | 8/2011 | Okuda et al. | 701/54 |
| 8,280,599 B2* | 10/2012 | Suzuki et al. | 701/54 |
| 8,515,640 B2* | 8/2013 | Monti et al. | 701/67 |
| 2003/0171867 A1* | 9/2003 | Nakamori et al. | 701/54 |
| 2005/0183916 A1* | 8/2005 | Katou et al. | 192/3.29 |
| 2010/0228453 A1* | 9/2010 | Saito | 701/54 |
| 2010/0292900 A1* | 11/2010 | Shimozato | 701/53 |

FOREIGN PATENT DOCUMENTS

| | | |
|---|---|---|
| JP | 07-217737 A | 8/1995 |
| JP | 09-317864 A | 12/1997 |
| JP | 2000-190757 A | 7/2000 |
| JP | 2002-047962 A | 2/2002 |
| JP | 2007-271019 A | 10/2007 |
| JP | 2009-250417 A | 10/2009 |
| JP | 2010-006326 A | 1/2010 |
| JP | 2010-014168 A | 1/2010 |
| SU | 1791174 A1 | 1/1993 |

* cited by examiner

CONTROL DEVICE AND METHOD FOR STEPPED TRANSMISSION ENSURING SMOOTH TRANSITION IN ENGINE IDLE STOP AND RESUMPTION CYCLE

TECHNICAL FIELD

The present invention relates to a control device and a control method for a transmission mechanism.

BACKGROUND ART

A conventional device which includes a mechanical oil pump and an electrical oil pump and in which a hydraulic pressure is supplied from the electrical oil pump to a gear corresponding to a starting shift position during an idle stop control is disclosed in JP2002-47962A.

SUMMARY OF INVENTION

However, in the above invention, an engine rotation speed temporarily increases to a rotation speed higher than an idle rotation speed when a return is made from the idle stop control and an engine restarts. A resulting drive torque is transmitted to an output shaft, thereby causing a shock, which raises the problem of giving a pushed feeling and a sense of incongruity to a driver.

The present invention was developed to solve such a problem and aims to reduce a sense of incongruity given to a driver when a return is made from an idle stop control.

One aspect of the present invention is directed to a control device for a transmission mechanism for controlling a stepped transmission mechanism which includes a first clutch to be engaged at startup and a second clutch different from the first clutch and is interlocked when a hydraulic pressure is supplied to the first clutch and the second clutch and the first clutch and the second clutch are completely engaged, including hydraulic control means for controlling a hydraulic pressure supplied to the stepped transmission mechanism so that the first clutch is set in a completely engaged state and the second clutch is set in a slip interlock state where the second clutch is not completely engaged in the case of a return from an idle stop control in which an engine is automatically stopped.

Another aspect of the present invention is directed to a control method for a stepped transmission mechanism which includes a first clutch to be engaged at startup and a second clutch different from the first clutch and is interlocked when a hydraulic pressure is supplied to the first clutch and the second clutch and the first clutch and the second clutch are completely engaged, including controlling a hydraulic pressure supplied to the transmission mechanism so that the first clutch is set in a completely engaged state and the second clutch is set in a slip interlock state where the second clutch is not completely engaged in the case of a return from an idle stop control in which an engine is automatically stopped.

When the hydraulic pressure is supplied to the second clutch different from the first clutch to be engaged at startup and the second clutch is engaged in the case of a return from the idle stop control, a drive torque transmitted to an output shaft is reduced. Thus, even if an engine rotation speed temporarily exceeds an idle rotation speed as the engine is started in the case of a return from the idle stop control, a pushed feeling given to the driver can be reduced since the drive torque transmitted to the output shaft is reduced.

However, if it is tried to completely engage and interlock the second clutch by setting a high command value for the hydraulic pressure supplied to the second clutch, a sense of incongruity may be given to the driver if a vehicle is stopped on a downhill.

Specifically, immediately after a brake pedal is completely released and a return is made from the idle stop control, a hydraulic pressure sufficient to completely engage the second clutch cannot be supplied to the second clutch due to a hydraulic pressure response delay. Thus, in the case of a return from the idle stop control in a state where the vehicle is stopped on a downhill, the vehicle moves forward under its own weight immediately after the brake pedal is completely released. Thereafter, when the hydraulic pressure for completely engaging the second clutch is supplied to the second clutch, the second clutch is interlocked, no drive torque is transmitted to the output shaft and the vehicle stops. When the interlock is released, the vehicle moves forward again. That is, the vehicle moves, temporarily stops and then moves again, thereby causing a problem of giving a sense of incongruity to the driver.

Contrary to this, according to the above aspects, it is possible to reduce a pushed feeling caused by a temporary increase of the engine rotation speed and reduce a sense of incongruity given to the driver by setting the second clutch in the slip interlock state where the second clutch is not completely engaged.

Embodiments of the present invention and advantages thereof are described in detail below with reference to the accompanying drawings.

EMBODIMENTS OF INVENTION

In the following description, a "speed ratio" of a certain transmission mechanism is a value obtained by dividing an input rotation speed of this transmission mechanism by an output rotation speed thereof. Further, a "lowest speed ratio" means a maximum speed ratio of this transmission mechanism and a "highest speed ratio" means a minimum speed ratio thereof.

Figure 1:
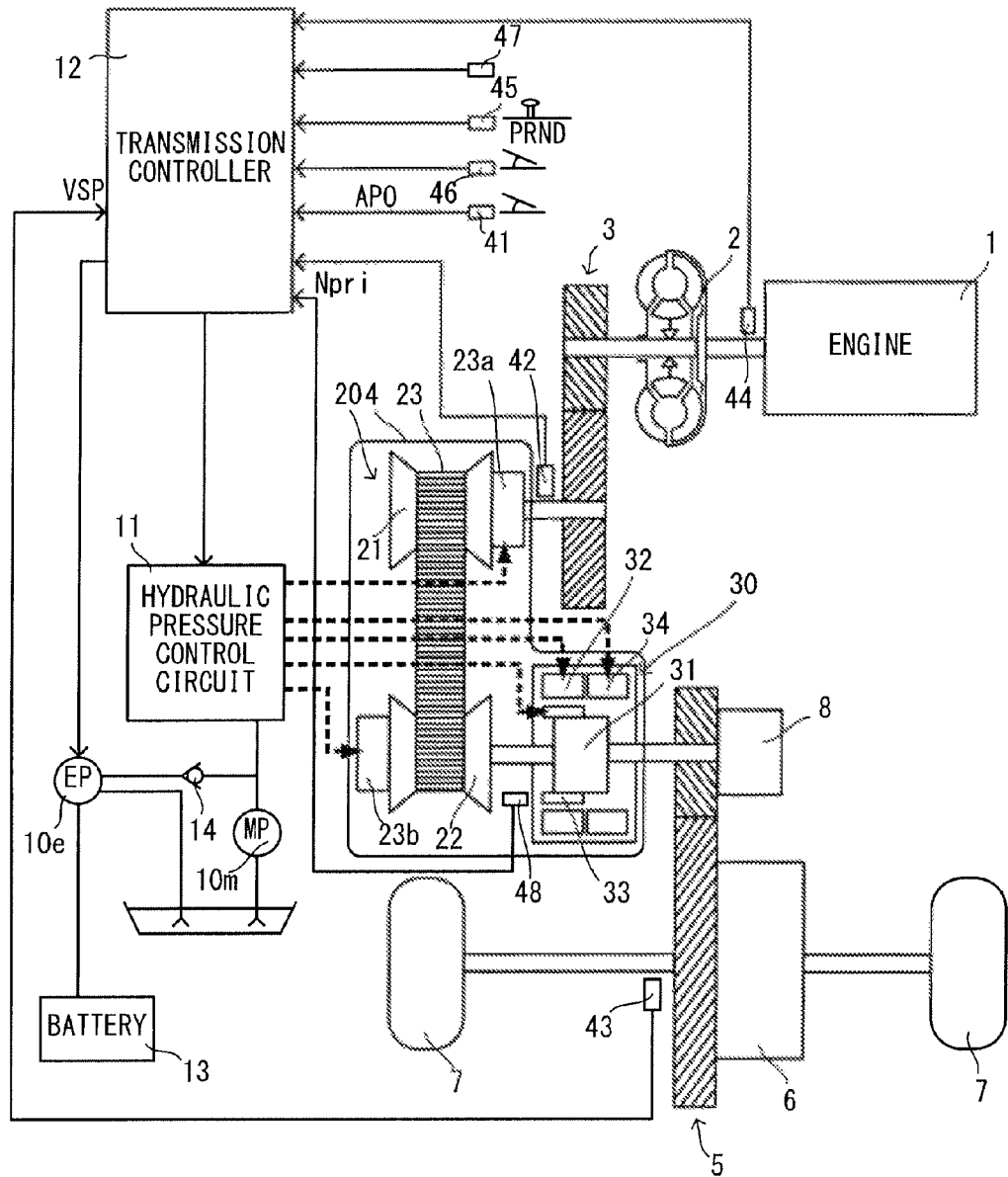
FIG. 1 is a schematic configuration diagram of a vehicle equipped with a control device for a transmission in a first embodiment of the present invention.

FIG. 1 is a schematic configuration diagram of a vehicle equipped with a control device for a transmission mechanism according to a first embodiment of the present embodiment. This vehicle includes an engine 1 as a drive source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final speed reducer 6. The second gear train 5 includes a parking mechanism 8 for mechanically locking an output shaft of the transmission 4 in a parked state so as not to be able to rotate.

The vehicle includes a mechanical oil pump 10m which is driven using a part of power of the engine 1, an electrical oil pump 10e which is driven by an electric motor, a hydraulic pressure control circuit 11 which adjusts a hydraulic pressure from the mechanical oil pump 10m or the electrical oil pump 10e and supplies the adjusted hydraulic pressure to each component of the transmission 4, and a transmission controller 12 for controlling the hydraulic pressure control circuit 11 and the like.

The electrical oil pump 10e is driven by the electric motor which is driven by the supply of power from a battery 13 and supplies a hydraulic pressure to the hydraulic pressure control circuit 11. Note that the electric motor is controlled by a motor driver. The electrical oil pump 10e supplies the hydraulic pressure to the hydraulic pressure control circuit 11 when the hydraulic pressure cannot be supplied by the mechanical oil pump 10m, for example, when an idle stop control is executed in which the engine 1 is automatically stopped. A check valve 14 is provided in a flow path in which oil discharged from the electrical oil pump 10e flows. A comparison of the electrical oil pump 10e and the mechanical oil pump 10m shows that the electrical oil pump 10e is smaller in size than the mechanical oil pump 10m.

The transmission 4 includes a belt-type continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission mechanism or power transmission mechanism (e.g. gear train). Alternatively, the sub-transmission mechanism 30 may be connected to a stage (input shaft side) preceding the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged such that a sheave surface faces toward the fixed conical plate and a V-groove is formed between the fixed conical plate and the movable conical plate, and a hydraulic cylinder 23a, 23b provided on the back surface of this movable conical plate for displacing the movable conical plate in an axial direction. When hydraulic pressures supplied to the hydraulic cylinders 23a, 23b are adjusted, the widths of the V-grooves change to change contact radii of the V-belt 23 and the respective pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake (first clutch) 32, high clutch (second clutch) 33, rev brake 34) which are connected to a plurality of rotation elements constituting the Ravigneaux-type planetary gear mechanism 31 to change coupled states of these rotation elements. If hydraulic pressures supplied to the respective frictional engagement elements 32 to 34 are adjusted to change engaged and released states of the respective frictional engagement elements 32 to 34, a gear position of the sub-transmission mechanism 30 is changed.

For example, the sub-transmission mechanism 30 is set to a first gear position if the low brake 32 is engaged and the high clutch 33 and the rev brake 34 are released. The transmission mechanism 30 is set to a second gear position having a smaller change gear ratio than the first gear position if the high clutch 33 is engaged and the low brake 32 and the rev brake 34 are released. Further, the sub-transmission mechanism 30 is set to a reverse gear position if the rev brake 34 is engaged and the low brake 32 and the high clutch 33 are released.

When the vehicle is started, the sub-transmission mechanism 30 is set at the first gear position. Further, when a return is made during the idle stop control in which the engine 1 is stopped to improve fuel economy while the vehicle is stopped, the low brake 32 is completely engaged by having the hydraulic pressure supplied thereto and the high clutch 33 is in a slip interlock state. The slip interlock state means a state where the high clutch 33 is not completely engaged and a predetermined slip state is set. Here, a state where the piston stroke of the high clutch 33 is completed and the high clutch 33 has been moved to a position where it is not completely engaged is referred to as the slip interlock state. Further, "to set the high clutch 33 in the slip interlock state" is referred to as to slip-interlock.

When the high clutch 33 is set in the slip interlock state, a part of drive power generated by the engine 1 is transmitted to the drive wheels 7. Note that when the low brake 32 is completely engaged and the hydraulic pressure supplied to the high clutch 33 is further increased from the hydraulic pressure in the slip interlock state, the high clutch 33 is completely engaged and the interlock state is set. When the interlock state is set, the drive power generated by the engine 1 is not transmitted to the drive wheels 7.

Each of the low brake 32, the high clutch 33 and the rev brake 34 of the sub-transmission mechanism 30 generates a transmission torque according to the hydraulic pressure supplied thereto.

When the vehicle stops, the high clutch 33 is held in a state where the supply of the hydraulic pressure is started so that the slip interlock state is set and the piston stroke of the high clutch 33 is finished. The vehicle is determined to be stopped, for example, in the case of satisfying conditions such as (1) a vehicle speed detected by a vehicle speed sensor 43 is zero, (2) there is no pulse signal from a rotation speed sensor 42 for detecting an input rotation speed of the transmission 4 (=rotation speed of the primary pulley 21) and the like and (3) the states of (1) and (2) have continued for a predetermined time.

The idle stop control is not started unless the hydraulic pressure of the high clutch 33 detected by a hydraulic pressure sensor 48 increases from zero to a hydraulic pressure at which the slip interlock state is set. Note that the idle stop control may be started upon the elapse of a time necessary to set the high clutch 33 in the slip interlock state. In this case, the necessary time is a time required for the hydraulic pressure of the high clutch 33 to increase from zero to the hydraulic pressure at which the slip interlock state is set.

By slip-interlocking the high clutch 33 during the idle stop control in this way, the high clutch 33 is reliably slip-interlocked in the case of a return from the idle stop control.

Further, the idle stop control is stopped, for example, when a depression amount of a brake pedal becomes smaller.

Figure 2:
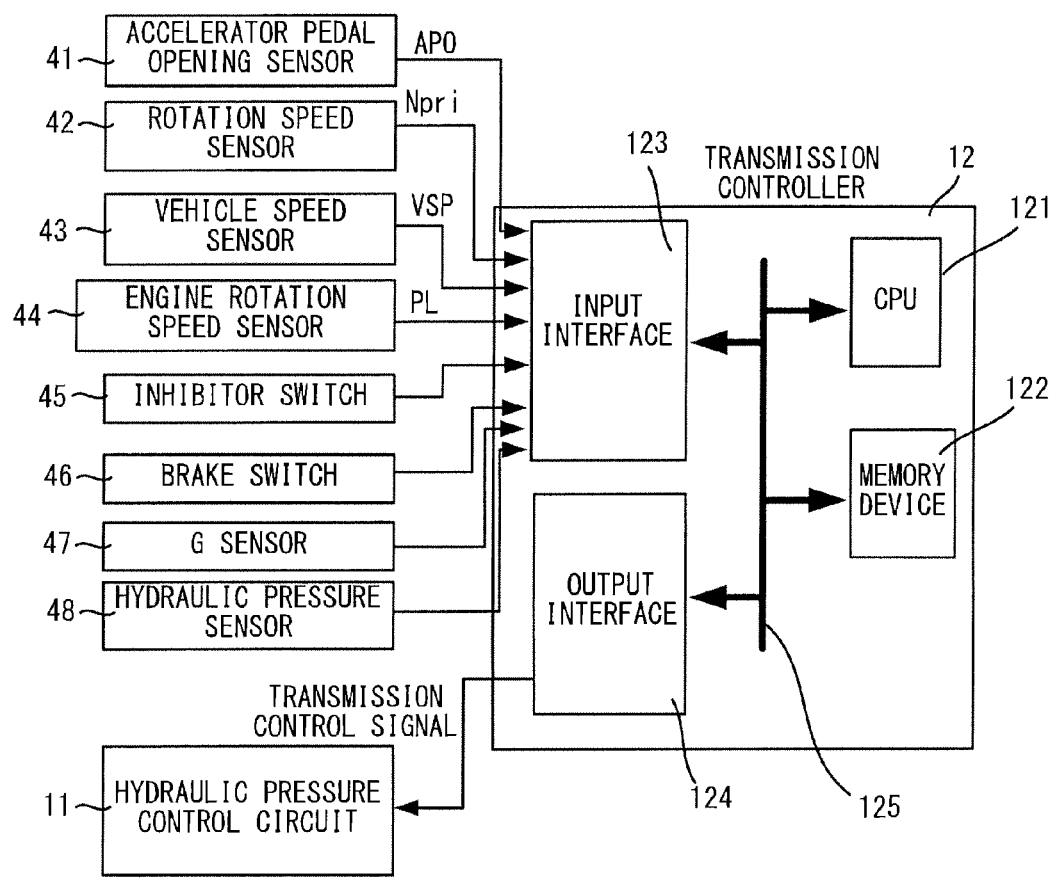
FIG. 2 is a schematic configuration diagram of a transmission controller in the first embodiment of the present invention.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operation amount of an accelerator pedal, an output signal of the rotation speed sensor 42 for detecting the input rotation speed of the transmission 4, an output signal of the vehicle speed sensor 43 for detecting a vehicle speed VSP, an output signal of an engine rotation speed sensor 44 for detecting an engine rotation speed, an output signal of an inhibitor switch 45 for detecting the position of a select lever, an output signal of a brake sensor 46 for detecting the depression of a foot brake, a signal from a G sensor 47 for detecting the gradient of the vehicle, an output signal from the hydraulic pressure sensor 48 for detecting the hydraulic pressure supplied to the high clutch 33, and the like.

A control program (FIG. 3) for controlling the sub-transmission mechanism 30 and the like are stored in the memory device 122. The CPU 121 reads the control program stored in the memory device 122 and implements it to generate a control signal by performing various arithmetic processings on various signals input via the input interface 123, and outputs the generated control signal to the hydraulic pressure control circuit 11, the electrical oil pump 10e and the like via the output interface 124. Various values used in the arithmetic processings by the CPU 121 and calculation results thereof are appropriately stored in the memory device 122.

The hydraulic pressure control circuit 11 is composed of a plurality of flow paths and a plurality of hydraulic control valves. The hydraulic pressure control circuit 11 switches a hydraulic pressure supply path, prepares a necessary hydraulic pressure from a hydraulic pressure produced in the mechanical oil pump 10m or the electrical oil pump 10e and supplies this to each component of the transmission 4 by controlling the plurality of hydraulic control valves based on a transmission control signal from the transmission controller 12. In this way, the speed ratio of the variator 20 and the gear position of the sub-transmission mechanism 30 are changed, whereby the transmission 4 is shifted.

When the vehicle is stopped, the idle stop control is executed in which the engine 1 is stopped to improve fuel economy. In this embodiment, the slip interlock is released to start the vehicle in the case of a return from the idle stop control.

Figure 3:
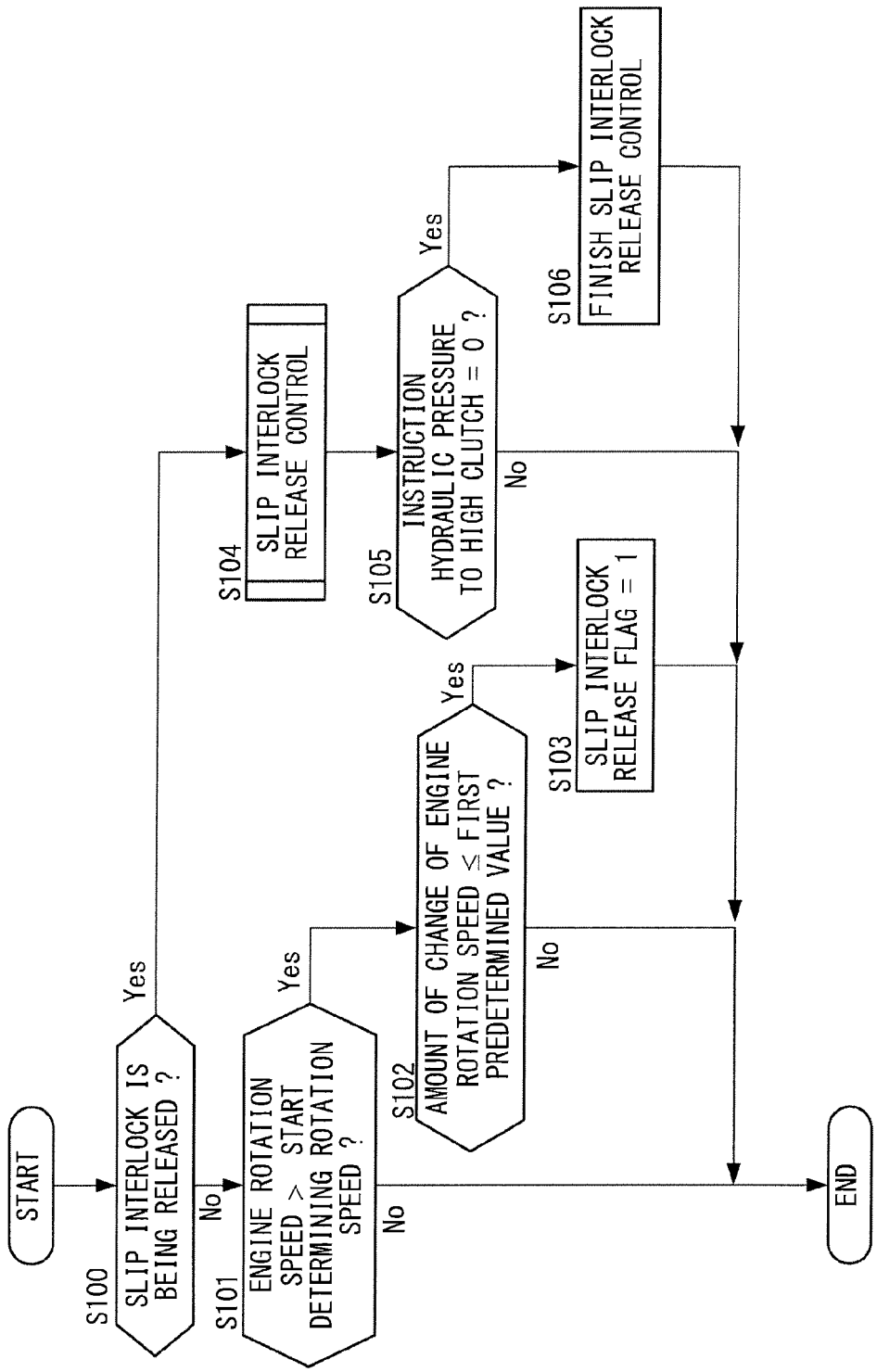
FIG. 3 is a flow chart showing a return control from an idle stop control in the first embodiment of the present invention.

Next, a return control from the idle stop control in this embodiment is described using a flow chart of FIG. 3. Note that it is assumed that a return from the idle stop control has been determined. This control is repeated until the slip interlock is completely released and is no longer executed when the slip interlock is completely released.

In Step S100, it is determined whether or not the slip interlock is being released. Here, it is determined whether or not a slip interlock release flag is "1". If the slip interlock release flag is "1", it is determined that the slip interlock is being released and Step S104 follows. On the other hand, if the slip interlock release flag is "0", it is determined that the slip interlock is not being released and Step S101 follows.

In Step S101, an engine rotation speed Ne is detected by the engine rotation speed sensor 44 and compared with a start determining rotation speed. Step S102 follows if the engine rotation speed Ne is higher than the start determining rotation speed, whereas the control this time is finished if the engine rotation speed Ne is equal to or lower than the start determining rotation speed. When a return is made from the idle stop control, the engine 1 is started and the engine rotation speed Ne gradually increases. The start determining rotation speed is a value which is set in advance and based on which it can be determined that the engine 1 is in operation.

If the engine rotation speed Ne increases, a discharge pressure of the mechanical oil pump 10m increases. This causes a hydraulic pressure necessary for engagement to be supplied to the low brake 32 and the low brake 32 is completely engaged. Further, an initial hydraulic pressure is supplied to the high clutch 33. Although the piston stroke has been completed in the high clutch 33 so that the slip interlock state is set when the idle stop control is started, a transmission torque corresponding to the initial hydraulic pressure is generated due to the supply of the initial hydraulic pressure.

The initial hydraulic pressure is a hydraulic pressure set in a range higher than a hydraulic pressure at which a torque output from the sub-transmission mechanism 30 can be reduced to reduce a pushed feeling given to a driver when the engine rotation speed Ne temporarily increases, i.e. when the engine 1 revs up. Further, the initial hydraulic pressure is a hydraulic pressure set in a range lower than a hydraulic pressure which is supplied to the high clutch 33 to engage the high clutch 33, thereby stopping the vehicle having moved under its own weight, in the case of a return from the idle stop control in a state where the vehicle is stopped on a downhill road surface.

Further, the initial hydraulic pressure is set according to the gradient of the road surface on which the vehicle is stopped. The gradient is detected by the G sensor 47. If the gradient detected by the G sensor 47 is an upward gradient, the initial hydraulic pressure increases as the upward gradient increases. Further, if the gradient detected by the G sensor 47 is a downward gradient, the initial hydraulic pressure decreases as the downward gradient increases (as the upward gradient decreases). Because of this, by increasing the initial hydraulic pressure when the upward gradient is large, a downward slide of the vehicle can be reduced. Further, by reducing the initial hydraulic pressure if the downward gradient is large, it is possible to reduce a drive power by the high clutch 33 and quickly start the vehicle without giving any sense of incongruity to the driver.

In Step S102, an amount of change (increased amount) ΔNe of the engine rotation speed Ne per unit time is calculated and it is determined whether or not the changed amount ΔNe is equal to or smaller than a first predetermined value. If the changed amount ΔNe is equal to or smaller than the first predetermined value, the rev-up of the engine 1 is determined to end and Step S103 follows. If the changed amount ΔNe is larger than the first predetermined value, the rev-up of the engine 1 is determined not to end and the control this time is finished. The changed amount ΔNe becomes smaller immediately before the rev-up of the engine 1 ends.

The changed amount ΔNe is calculated by converting a deviation between the engine rotation speed Ne detected this time and the engine rotation speed Ne detected last time into a changed amount per unit time. Alternatively, the changed amount ΔNe per unit time may be calculated from the engine rotation speed Ne stored in the memory device 122. The first predetermined value is a value at which the rev-up of the engine 1 can be determined to end in the case of a return from the idle stop control and, for example, set at zero. Further, the first predetermined value is set according to the gradient detected by the G sensor 47. If the gradient detected by the G sensor 47 is an upward gradient, the first predetermined value increases as the upward gradient increases. This can advance a start timing of the slip interlock release control if the upward gradient is large. Further, if the gradient detected by the G sensor 47 is a downward gradient, the first predetermined value decreases as the downward gradient increases. This can advance the start timing of the slip interlock release control if the downward gradient is large. Note that although the changed amount ΔNe of the engine rotation speed Ne per unit time is calculated here, the deviation between the engine rotation speed Ne detected this time and the engine rotation speed Ne detected last time may be compared with a predetermined changed amount.

Note that the engine rotation speed Ne is stored in the memory device 122. Note that the stored engine rotation speed Ne is referred to as an engine rotation speed Ne' below.

In Step S103, the slip interlock release flag is set to "1". This causes the slip interlock release control to be started at the next control. Note that the slip interlock release flag is set at "0" as an initial value.

If the slip interlock release flag is determined to be "1" in Step S100, the slip interlock release control is executed in Step S104.

Figure 4:
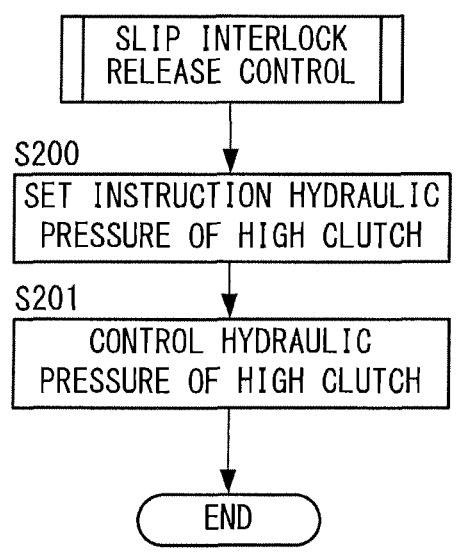
FIG. 4 is a flow chart showing a slip interlock release control in the first embodiment of the present invention.

The slip interlock release control is described using a flow chart of FIG. 4.

In Step S200, an instruction hydraulic pressure of the high clutch 33 is set. The instruction hydraulic pressure of the high clutch 33 is set to monotonously decrease with a predetermined release gradient from the initial hydraulic pressure. Here, the instruction hydraulic pressure of the high clutch 33 is so calculated and set that a decreased amount per unit time is a second predetermined value. Note that a hydraulic pressure obtained by subtracting a predetermined decreased amount from the instruction hydraulic pressure to the high clutch 33 calculated last time is calculated as the instruction hydraulic pressure to the high clutch 33. The predetermined decreased amount is a value calculated in correspondence with the second predetermined value.

The second predetermined value is set in advance through experiments so that a shock given to a driver while the slip interlock is released is small, a pushed feeling is reduced and a feeling of slowness at startup is not given to the driver. The second predetermined value is set according to the gradient detected by the G sensor 47. If the gradient detected by the G sensor 47 is an upward gradient, the second predetermined value increases and the predetermined release gradient increases as the upward gradient increases. This causes the slip interlock to be released earlier, whereby it is possible to reduce a backward and downward slide of the vehicle and quickly start the vehicle. Further, if the gradient detected by the G sensor 47 is a downward gradient, the second predetermined value increases as the downward gradient increases. This causes the slip interlock to be released earlier, whereby the vehicle can be quickly started.

In Step S201, the hydraulic pressure of the high clutch 33 is controlled. The hydraulic pressure of the high clutch 33 is controlled based on the set instruction hydraulic pressure of the high clutch 33.

Referring back to FIG. 3, in Step S105, it is determined whether or not the instruction hydraulic pressure to the high clutch 33 has become zero. Step S106 follows if the instruction hydraulic pressure to the high clutch 33 is zero, whereas the control this time is finished unless the instruction hydraulic pressure to the high clutch 33 is zero.

In Step S106, the slip interlock release control is finished. The slip interlock release flag is reset to "0".

By the above control, the hydraulic pressure supplied to the high clutch 33 is reduced with the predetermined release gradient from the initial hydraulic pressure to release the slip interlock.

Figure 5:
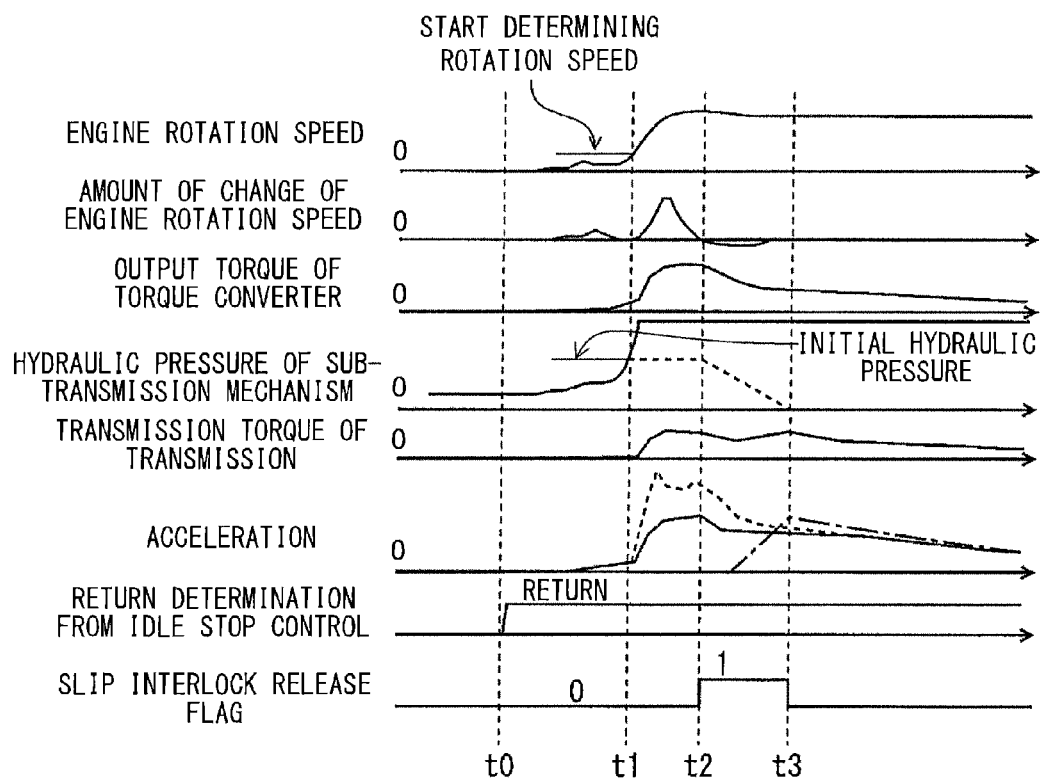
FIG. 5 is a time chart showing an acceleration change and the like in the first embodiment of the present invention.

Next, changes of acceleration applied to the vehicle and the like when the return control from the idle stop control of this embodiment is executed are described using a time chart of FIG. 5. FIG. 5 is a time chart when the road surface on which the vehicle is stopped is flat.

When the return from the idle stop control is determined at time t0, the engine rotation speed Ne increases and an output torque of the torque converter 2 also increases. The hydraulic pressure is supplied from the electrical oil pump 10e during the idle stop control. Since the discharge pressure of the mechanical oil pump 10m is large due to an increase in the engine rotation speed Ne, the hydraulic pressure supplied to the low brake 32 and the high clutch 33 increases.

At time t1, the hydraulic pressure of the high clutch 33 becomes the initial hydraulic pressure and the high clutch 33 is set in the slip interlock state corresponding to the initial hydraulic pressure. In FIG. 5, the hydraulic pressure of the low brake 32 is shown by solid line and that of the high clutch 33 is shown by broken line. Further, at time t1, the engine rotation speed Ne becomes the start determining rotation speed. Note that although the hydraulic pressure of the high clutch 33 becomes the initial hydraulic pressure and the engine rotation speed Ne becomes the start determining rotation speed at the same timing, there is no limitation to this.

In FIG. 5, acceleration applied to the vehicle (shock given to the driver) when neither the slip interlock nor the interlock is performed is shown by broken line.

When neither the slip interlock nor the interlock is performed, the acceleration applied to the vehicle increases, a shock given to the driver increases and a pushed feeling increases as the engine 1 revs up. However, in this embodiment, the acceleration applied to the vehicle decreases and the pushed feeling given to the driver decreases by performing the slip interlock.

When the changed amount ΔNe of the engine rotation speed Ne becomes equal to or smaller than the first predetermined value at time t2, the slip interlock release flag is set to "1" and the slip interlock release control is started. In this way, the hydraulic pressure of the high clutch 33 is gradually reduced and the slip interlock is released. Note that the first predetermined value is set at zero here.

In FIG. 5, the acceleration applied to the vehicle when the high clutch 33 is interlocked is shown by dashed-dotted line.

Since the high clutch 33 is completely engaged when being interlocked, it takes a longer time until the high clutch 33 is released when a return is made from the idle stop control and the vehicle is started, whereby vehicle startability becomes poor and a feeling of slowness is given to the driver. In this embodiment, by slip-interlocking the high clutch 33, the vehicle is more quickly accelerated and vehicle startability is better as compared with the case where the high clutch 33 is interlocked.

When the instruction hydraulic pressure of the high clutch 33 becomes zero at time t3, the slip interlock release control is finished and the slip interlock release flag is set to "0".

Figure 6:
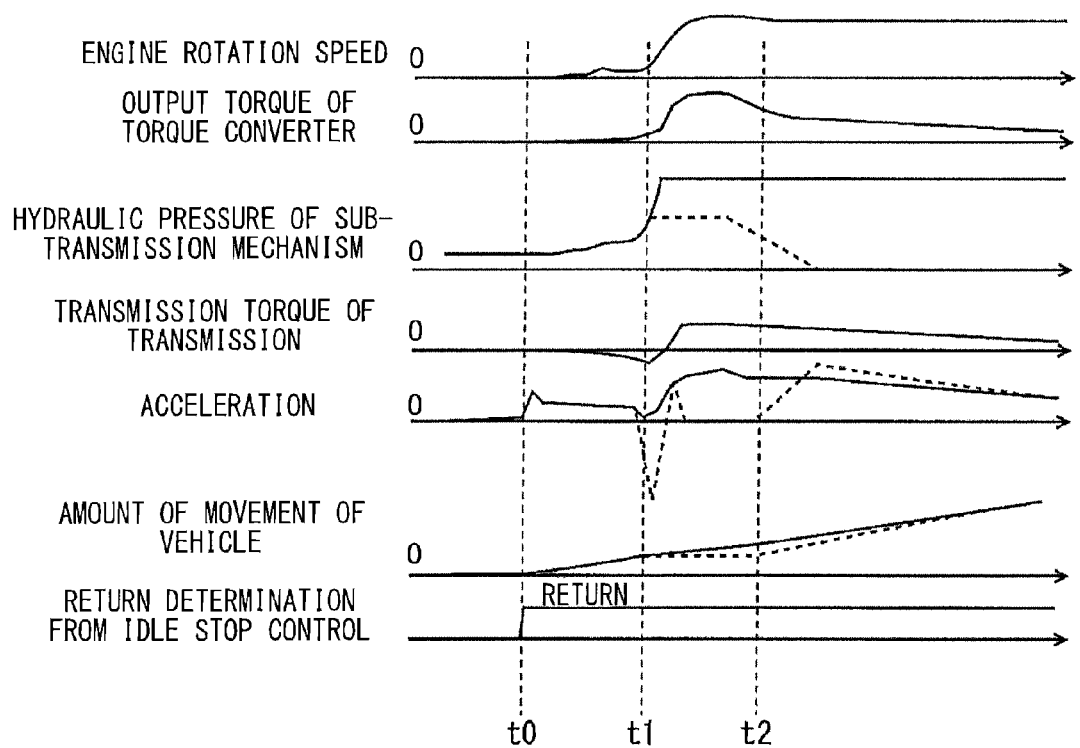
FIG. 6 is a time chart showing an acceleration change and the like in the first embodiment of the present invention.

Next, a case where the vehicle is stopped on a downhill road surface is described using a time chart of FIG. 6. The description here is centered on characteristic points as compared with the case where the high clutch 33 is interlocked.

When a return from the idle stop control is determined at time t0, for example, due to a decreasing depression of the brake pedal, the vehicle starts moving on the downhill road surface under its own weight. In this case, since the engine rotation speed Ne is not high, the discharge pressure of the mechanical oil pump 10m is low and the transmission torque of the high clutch 33 is small, wherefore the vehicle starts moving.

At time t1, the hydraulic pressure of the high clutch 33 becomes the initial hydraulic pressure and the high clutch 33 is set in the slip interlock state where the transmission torque corresponding to the initial hydraulic pressure is generated.

Note that since no drive power is transmitted to the drive wheels 7 when the high clutch 33 is interlocked, the vehicles stops and a large shock caused by the stop is given to the vehicle. The acceleration of the vehicle and the amount of movement of the vehicle when the interlock state is set are shown by broken line in FIG. 6.

On the other hand, since the high clutch 33 is slip-interlocked in this embodiment, the vehicle does not stop and a smaller shock occurs.

When the high clutch 33 is interlocked, the release of the interlock of the high clutch 33 is, thereafter, started at time t2 and the vehicle starts moving again. Thus, when the high clutch 33 is interlocked, the vehicle starts moving and temporarily stops due to the interlock when a return is made from the idle stop control. Thereafter, the interlock is released, whereby the vehicle starts moving again. Thus, a sense of incongruity is given to the driver.

On the other hand, since the high clutch 33 is slip-interlocked in this embodiment, the vehicle does not temporarily stop and a sense of incongruity given to the driver can be reduced.

Effects of the first embodiment of the present invention are described.

By slip-interlocking the high clutch 33 different from the low brake 32 for startup in the case of a return from the idle stop control, it is possible to suppress a shock caused by the rev-up of the engine 1 and reduce a pushed feeling given to the driver (corresponding to claim 1).

Further, by slip-interlocking the high clutch 33 instead of interlocking it, it is possible to improve vehicle startability and suppress a feeling of slowness given to the driver. Particularly, if the vehicle is stopped on a downhill, the vehicle starts moving upon a return from the idle stop control and temporarily stops due to the interlock when the high clutch 33 is interlocked. Thereafter, the interlock is released, whereby the vehicle starts moving again. In this case, the vehicle is shaken in forward and backward directions due to its temporarily stop and a shock is given to the driver. Further, a sense of incongruity is given to the driver because of the vehicle that starts moving, stops and starts moving again. Contrary to this, in this embodiment, a shock and a sense of incongruity given to the driver can be reduced by slip-interlocking the high clutch 33.

Since the slip interlock release control is started when the changed amount ΔNe of the engine rotation speed Ne becomes equal to or smaller than the first predetermined value, it is possible to reduce the occurrence of a shock caused by the rev-up of the engine 1 and reduce a pushed feeling.

Since the hydraulic pressure of the high clutch 33 is decreased with the predetermined release gradient in the slip interlock release control, the vehicle can be started with a pushed feeling given to the driver reduced.

By increasing the initial hydraulic pressure as the upward gradient increases, it is possible to reduce a backward and downward slide of the vehicle and improve vehicle startability in the case of a return from the idle stop control.

By starting the slip interlock release control earlier as the upward gradient increases, the output torque of the sub-transmission mechanism 30 increases quickly, wherefore it is possible to reduce a backward and downward slide of the vehicle and improve vehicle startability.

By increasing the predetermined release gradient as the upward gradient increases, the output torque of the sub-transmission mechanism 30 increases quickly, wherefore it is possible to reduce a backward and downward slide of the vehicle and improve vehicle startability.

By starting the supply of the hydraulic pressure of the high clutch 33 and slip-interlocking the high clutch 33 when the vehicle stops, the high clutch 33 can be reliably slip-interlocked even when a return is made from the idle stop control, for example, because the depression of the brake pedal decreases immediately after the idle stop control is executed.

Since the idle stop control is started after the high clutch 33 is slip-interlocked, the high clutch 33 can be reliably slip-interlocked in the case of a return from the idle stop control.

Next, a second embodiment of the present invention is described. The description of the second embodiment is centered on parts different from the first embodiment.

In this embodiment, a method for calculating the instruction hydraulic pressure to the high clutch 33 in the slip interlock release control in the case of a return from the idle stop control differs.

Figure 7:
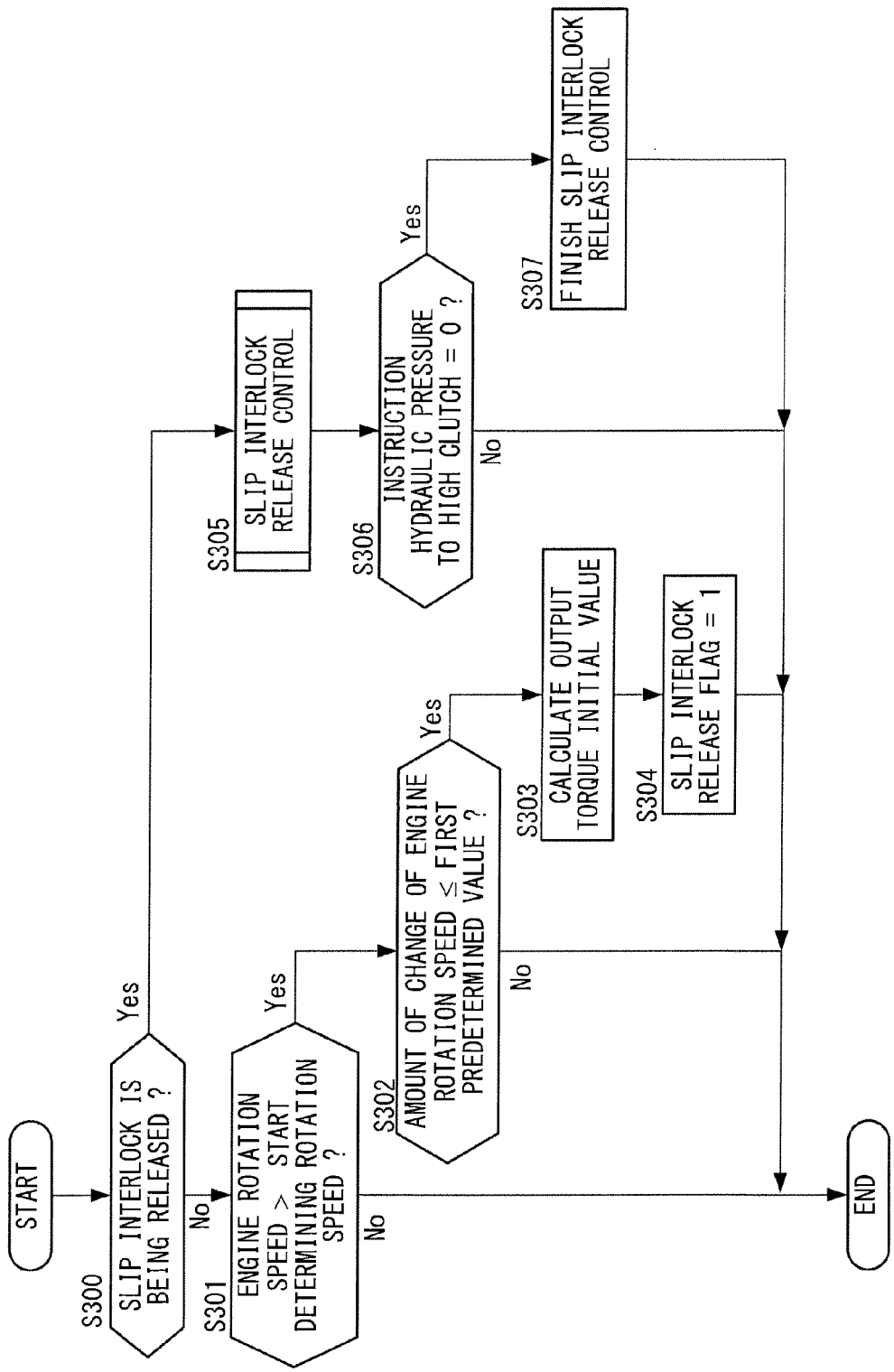
FIG. 7 is a flow chart showing a return control from an idle stop control in a second embodiment of the present invention.

Here, a return control from an idle stop control is described using a flow chart of FIG. 7.

Since the control from Steps S300 to S302 is the same as that from Steps S100 to S102 of the first embodiment, this control is not described.

In Step S303, an output torque initial value in the sub-transmission mechanism 30 at the start of the slip interlock release control is calculated. The output torque initial value is calculated as follows.

Generally, in a stepped transmission mechanism with discrete gear positions to be shifted, there is a relationship as in Equation (1) among an actual input torque T1M to the stepped transmission mechanism, a transmission torque in a High side gear position and an actual output torque T1out of the stepped transmission mechanism when a sufficient torque capacity of a start clutch is ensured.

$$\text{Actual output torque } T1\text{out} \times A = \text{actual input torque } T1\text{in} - \text{transmission torque in High side gear position} \quad (1)$$

A denotes a coefficient determined by a gear ratio, a loss and the like of the stepped transmission mechanism. Further, the transmission torque in the High side gear position is generated by the supply of a predetermined hydraulic pressure to a High side gear.

Further, since an output torque T2out of a torque converter is transmitted to the stepped transmission mechanism when the torque converter is included, the actual input torque T1in of the stepped transmission is equal to the output torque T2out of the torque converter if members such as a gear are not arranged between the stepped transmission mechanism and the torque converter and there is no loss.

The output torque T2out of the torque converter is calculated based on Equation (2).

$$\text{Output torque } T2\text{out} = \tau \times Ne^2 \times t \quad (2)$$

τ denotes the torque capacity of the torque converter and t denotes a torque ratio.

However, in this embodiment, the first gear train 3 and the transmission 4 are arranged between the torque converter 2 and the sub-transmission mechanism 30. Thus, the actual input torque T1in input to the sub-transmission mechanism 30 is expressed by multiplying the output torque T2out calculated by Equation (2) by a coefficient B which takes into account the gear ratios, losses and the like in the first gear train 3 and the transmission 4.

Thus, Equation (1) becomes Equation (3) in this embodiment.

$$\text{Actual output torque } T1out \times A = \text{output torque } T2out \times B - \text{transmission torque of high clutch 33} \quad (3)$$

The output torque T2out is an input torque T3 of the sub-transmission mechanism 3 below for the sake of convenience.

Note that when the slip interlock release control is started, the low brake 32 is engaged and the high clutch 33 is slip-interlocked by the hydraulic pressure supplied from the mechanical oil pump 10m. That is, the torque capacity of the low brake 32 is ensured.

Because of the above, the actual output torque T1out is calculated by Equation (4).

$$\text{Actual output torque } T1out = (\text{input torque } T3 \times B - \text{transmission torque of high clutch 33})/A \quad (4)$$

The input torque T3 at the start of the slip interlock release control can be calculated by Equation (2) using the engine rotation speed Ne detected in Step S301. Further, the transmission torque of the high clutch 33 is generated according to the initial hydraulic pressure of the high clutch 33. Thus, the actual output torque T1out at the start of the slip interlock release control can be calculated based on the engine rotation speed Ne. This actual output torque T1out becomes the output torque initial value at the start of the slip interlock release control.

In Step S304, the slip interlock release flag is set to "1".

Figure 8:
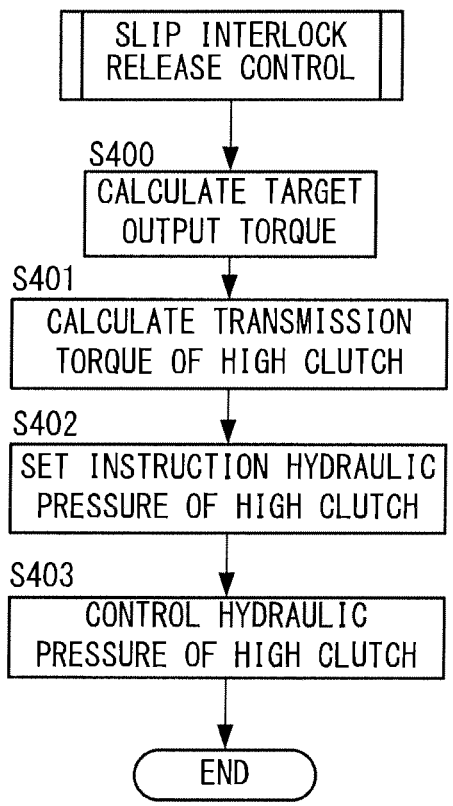
FIG. 8 is a flow chart showing a slip interlock release control in the second embodiment of the present invention.

In Step S305, the slip interlock release control is executed. The slip interlock release control is described using a flow chart of FIG. 8.

In Step S400, a target output torque T1o is calculated. The target output torque T1o is so set that the actual output torque T1out of the sub-transmission mechanism 30 monotonously increases with a predetermined upward gradient from the output torque initial value. Here, the target output torque T1o is calculated by adding a third predetermined value to an actual output torque T1out' calculated last time.

The third predetermined value is such a value set in advance through experiments that a feeling of slowness at startup is not given to the driver and a shock given to the driver decreases when the actual output torque T1out is monotonously increased with a predetermined upward gradient. By adding the third predetermined value, the target output torque T1o monotonously increases so that an amount of increase per unit time becomes a predetermined increased amount. The third predetermined value is set according to the gradient detected by the G sensor 47. If the gradient detected by the G sensor 47 is an upward gradient, the third predetermined value increases as the upward gradient increases. When the third predetermined value increases, the upward gradient of the target output torque T1o increases. Further, if the gradient detected by the G sensor 47 is a downward gradient, the third predetermined value increases as the downward gradient increases.

In Step S401, the transmission torque of the high clutch 33 is calculated. The transmission torque of the high clutch 33 is calculated by Equation (5) using the target output torque T1o.

$$\text{Transmission torque of high clutch 33} = \text{input torque } T3 \times B - \text{target output torque } T1o \times A \quad (5)$$

Note that the input torque T3 is calculated by Equation (2) using the engine rotation speed Ne detected by the engine rotation speed sensor 44.

The transmission torque of the high clutch 33 is so calculated that the actual output torque T1out of the sub-transmission mechanism 30 monotonously increases with the predetermined upward gradient from the output torque initial value. That is, the transmission torque of the high clutch 33 decreases.

In Step S402, the instruction hydraulic pressure of the high clutch 33 is set. The instruction hydraulic pressure of the high clutch 33 is calculated and set to realize the calculated transmission torque of the high clutch 33. That is, the instruction hydraulic pressure of the high clutch 33 is so calculated that the actual output torque T1out of the sub-transmission mechanism 30 monotonously increases with the predetermined upward gradient from the output torque initial value. Note that the third predetermined value increases and the upward gradient of the target output torque T1o increases as the upward gradient increases or as the downward gradient increases. Thus, a decreased amount of the instruction hydraulic pressure of the high clutch 33 per unit time increases as the upward gradient increases or as the downward gradient increases.

In Step S403, the hydraulic pressure supplied to the high clutch 33 is controlled based on the instruction hydraulic pressure of the high clutch 33. A decreased amount of the hydraulic pressure supplied to the high clutch 33 per unit time increases as the upward gradient increases or as the downward gradient increases. As the upward gradient increases, the hydraulic pressure supplied to the high clutch 33 more quickly decreases, the slip interlock is released earlier, a downward and backward slide of the vehicle can be reduced and the vehicle can be quickly started. Further, as the downward gradient increases, the hydraulic pressure supplied to the high clutch 33 more quickly decreases, the slip interlock is released earlier and the vehicle can be quickly started.

By the above control, the hydraulic pressure of the high clutch 33 is so controlled that the actual output torque T1out of the sub-transmission mechanism 30 monotonously increases with the predetermined upward gradient.

Referring back to FIG. 7, in Step S306, it is determined whether or not the instruction hydraulic pressure of the high clutch 33 has become zero. Step S307 follows if the instruction hydraulic pressure to the high clutch 33 is zero, whereas the control this time is finished unless the instruction hydraulic pressure to the high clutch 33 is zero.

In Step S307, the slip interlock release control is finished. The slip interlock release flag is reset to "0".

Figure 9:
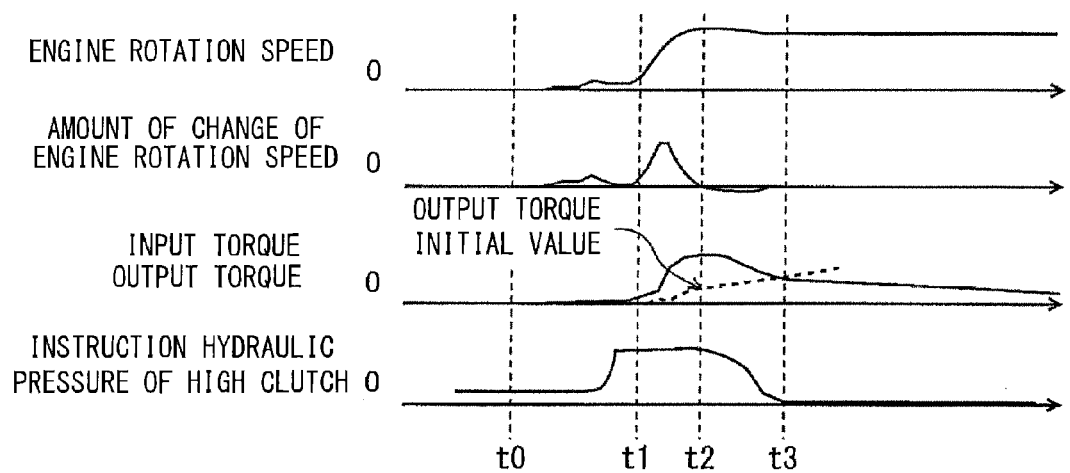
FIG. 9 is a time chart showing changes of an input torque and an output torque of a sub-transmission mechanism and the like in the second embodiment of the present invention.

Next, changes of the input torque T3 and the output torque T1out of the sub-transmission mechanism 30 and the like when a return control from the idle stop control of this embodiment is executed are described using a time chart of FIG. 9. Note that the output torque T1out is shown by broken line.

The engine rotation speed Ne increases after a return from the idle stop control is determined at time t0.

When the engine rotation speed Ne becomes the start determining rotation speed at time t1 and the changed amount ΔNe of the engine rotation speed Ne becomes equal to or lower than the first predetermined value at time t2, the output torque initial value at the start of the slip interlock release control is calculated and the slip interlock release control is started. The target output torque T1o of the sub-transmission mechanism 30 is calculated to monotonously increase with the predetermined upward gradient from the output torque initial value. Further, the instruction hydraulic pressure of the high clutch 33 is set to realize the target output torque T1o, and the instruction hydraulic pressure of the high clutch 33 decreases.

When the instruction hydraulic pressure of the high clutch 33 becomes zero at time t3, the slip interlock release control is finished.

Effects of the second embodiment of the present invention are described.

By controlling the hydraulic pressure of the high clutch 33 so that the actual output torque T1out of the sub-transmission mechanism 30 monotonously increases with the predetermined upward gradient, it is possible to reduce a variation of the torque output from the sub-transmission mechanism 30 and reduce a pushed feeling given to the driver, a feeling of slowness at startup and a sense of incongruity given to the driver in the case of a return from the idle stop control.

By increasing the upward gradient of the target output torque T1o as the upward gradient increases, the decreased amount of the hydraulic pressure of the high clutch 33 per unit time can be increased. Thus, in the case of a return from the idle stop control, the output torque T1out of the sub-transmission mechanism 30 more quickly increases, wherefore it is possible to reduce a downward slide of the vehicle and improve vehicle startability.

Next, a third embodiment of the present invention is described. The description of the third embodiment is centered on parts different from the second embodiment.

This embodiment differs in the method for calculating the instruction hydraulic pressure of the high clutch 33 in the slip interlock release control in the case of a return from the idle stop control.

Figure 10:
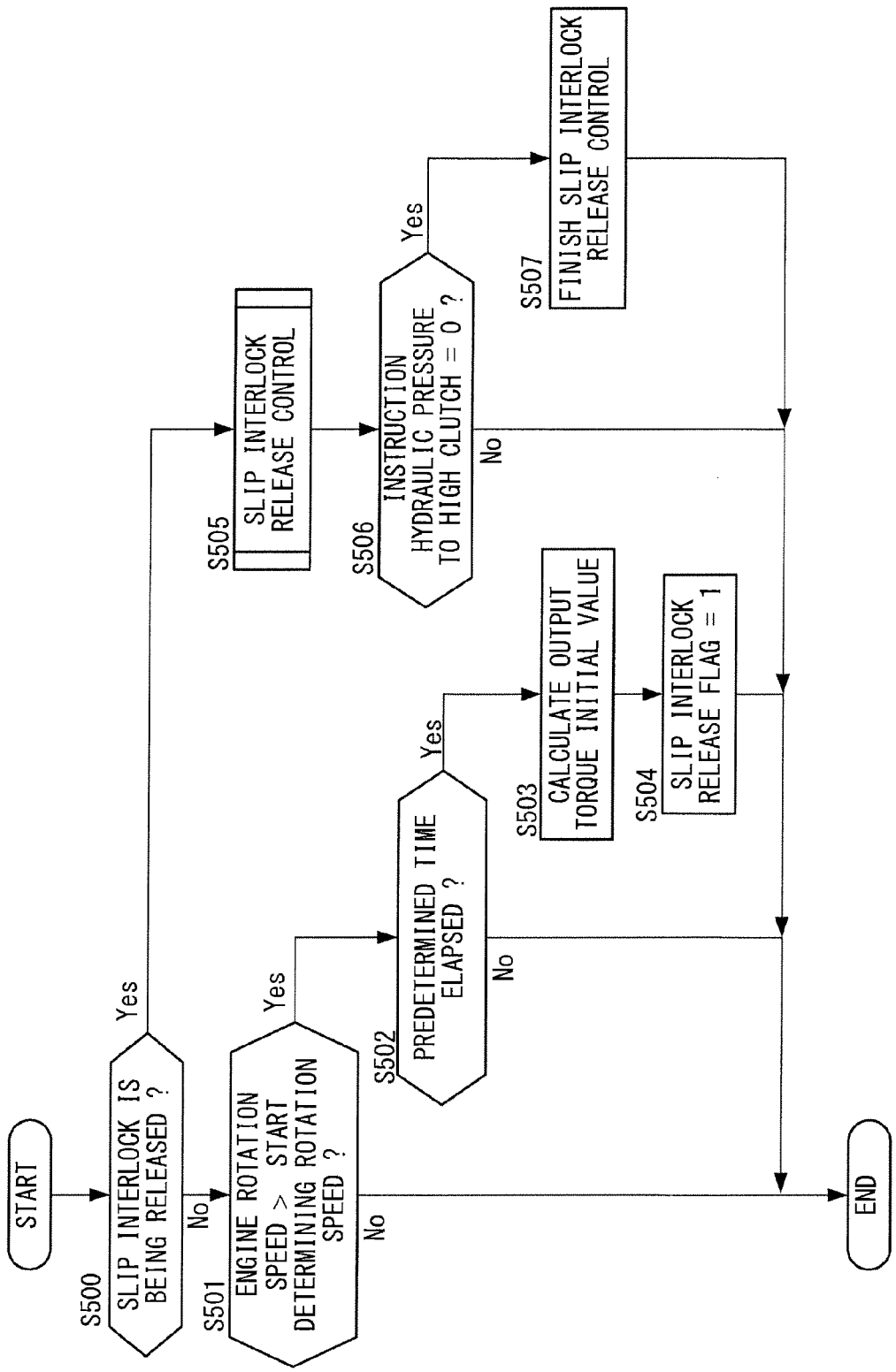
FIG. 10 is a flow chart showing a return control from an idle stop control in a third embodiment of the present invention.

Here, a return control from an idle stop control is described using a flow chart of FIG. 10.

Since the control in Steps S500 and S501 is the same as that in Steps S100 and S101 of the first embodiment, this control is not described.

In Step S502, it is determined whether or not a predetermined time has elapsed after the engine rotation speed Ne becomes larger than the start determining rotation speed. The predetermined time is a time by which it can be accurately determined that the engine rotation speed Ne has become larger than the start determining rotation speed. This can prevent the slip interlock release control from being started when the engine rotation speed Ne temporarily becomes larger than the start determining rotation speed.

Since the control in Steps S503 and S504 is the same as that in Steps S303 and S304 of the second embodiment, this control is not described.

Figure 11:
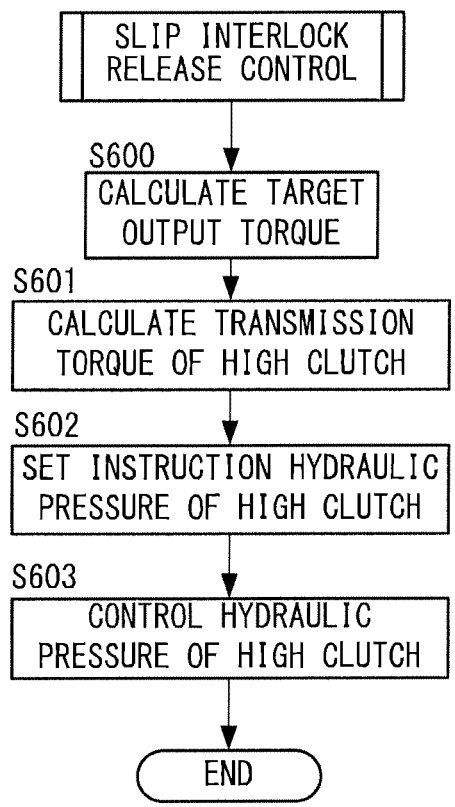
FIG. 11 is a flow chart showing a slip interlock release control in the third embodiment of the present invention.

In Step S505, the slip interlock release control is executed. The slip interlock release control is described using a flow chart of FIG. 11.

In Step S600, the target output torque T1o is calculated. The target output torque T1o is calculated based on Equation (6).

Target output torque $T1o \times A$=(target output torque $T1o \times A$)'+MAX{input torque $T3 \times B$−(input torque $T3 \times B$)', fourth predetermined value} (6)

[(Target output torque T1o×A)'] is a value of the target output torque T1o×A calculated last time and stored in the memory device 122. [(input torque T3×B)'] is the input torque T3×B calculated last time and stored in the memory device 122.

The fourth predetermined value is such a value set in advance as a minimum increased amount of the target output torque T1o that a feeling of slowness at startup is not given to the driver and a shock given to the driver decreases. The fourth predetermined value is set according to the gradient detected by the G sensor 47. If the gradient detected by the G sensor 47 is an upward gradient, the fourth predetermined value increases as the upward gradient increases. If the gradient detected by the G sensor 47 is a downward gradient, the fourth predetermined value increases as the downward gradient increases. The fourth predetermined value is, for example, a value equal to the third predetermined value of the second embodiment.

In the case of a return from the idle stop control, the engine 1 revs up, the engine rotation speed Ne temporarily increases and converges to an idle rotation speed. When the engine 1 revs up, an increased amount of the engine rotation speed Ne increases.

Thus, in [MAX{input torque T3×B−(input torque T3×B)', fourth predetermined value}], [input torque T3×B−(input torque T3×B)'] is larger than the fourth predetermined value when a return is made from the idle stop control, the engine 1 revs up and the increased amount of the engine rotation speed Ne is large. On the other hand, after the engine 1 revs up, the fourth predetermined value is larger than [input torque T3×B−(input torque T3×B)']. The fourth predetermined value is set according to the upward gradient detected by the G sensor 47. Therefore, a range in which the fourth predetermined value is selected by MAX{input torque T3×B−(input torque T3×B)', fourth predetermined value} becomes wider if the fourth predetermined value increases.

The target output torque T1o is as in Equation (7) when [input torque T3×B−(input torque T3×B)'] is larger than the fourth predetermined value.

Target output torque $T1o \times A$=(target output torque $T1o \times A$)'+input torque $T3 \times B$−(input torque $T3 \times B$)' (7)

In the calculation this time, an increase of the input torque T3 which is a deviation between the input torque T3 calculated this time and an input torque T3' calculated last time is added to the target output torque T1o calculated last time. Equation (7) can be rewritten into Equation (8).

Target output torque $T1o \times A$−input torque $T3 \times B$=(target output torque $T1o \times A$)'−(input torque $T3 \times B$)' (8)

If [input torque T3×B−(input torque T3×B)'] is larger than the fourth predetermined value, changed amounts of the input torque T3 and the target output torque T1o of the sub-transmission mechanism 30 are equal to changed amounts in the last calculation. That is, if [input torque T3×B−(input torque T3×B)'] is larger than the fourth predetermined value, the slip interlock state in the last calculation may be kept without changing the slip interlock state of the high clutch 33.

On the other hand, if the fourth predetermined value is larger than [input torque T3×B−(input torque T3×B)'], the target output torque T1o is as in Equation (9).

Target output torque $T1o \times A$=(target output torque $T1o \times A$)'+fourth predetermined value (9)

Equation (9) indicates that the target output torque T1o is monotonously increased by the fourth predetermined value from [(target output torque T1o×A)'] calculated last time.

In Step S601, the transmission torque of the high clutch 33 is calculated. If [input torque T3×B−(input torque T3×B)'] is larger than the fourth predetermined value, the transmission torque of the high clutch 33 is the transmission torque of the high clutch 33 in the last calculation.

On the other hand, if the fourth predetermined value is larger than [input torque T3×B−(input torque T3×B)'], the transmission torque of the high clutch 33 is calculated by Equation (5) using the calculated target output torque T1o. The transmission torque of the high clutch 33 is so calculated that the actual output torque T1out of the sub-transmission mechanism 30 monotonously increases with a predetermined upward gradient. Note that if the fourth predetermined value increases, a range in which the fourth predetermined value is larger than [input torque T3×B−(input torque T3×B)'] becomes wider.

In Step S602, the instruction hydraulic pressure of the high clutch 33 is set. The instruction hydraulic pressure of the high clutch 33 is calculated and set to realize the calculated transmission torque of the high clutch 33. If [input torque T3×B−(input torque T3×B)'] is larger than the fourth predetermined value, the instruction hydraulic pressure of the high clutch 33 is the instruction hydraulic pressure of the high clutch 33 in the last calculation.

On the other hand, if the fourth predetermined value is larger than [input torque T3×B−(input torque T3×B)'], the actual output torque T1out of the sub-transmission mechanism 30 is set to monotonously increase with the predetermined upward gradient. Note that the fourth predetermined value increases and the upward gradient of the target output torque T1$o$ increases as the upward gradient increases or as the downward gradient increases. Thus, a decreased amount of the instruction hydraulic pressure of the high clutch 33 per unit time increases as the upward gradient increases or as the downward gradient increases. Further, if the fourth predetermined value increases, the range in which the fourth predetermined value is larger than [input torque T3×B−(input torque T3×B)'] becomes wider and, for example, a timing at which the instruction hydraulic pressure of the high clutch 33 falls below the initial hydraulic pressure is advanced.

In Step S603, the hydraulic pressure supplied to the high clutch 33 is controlled based on the instruction hydraulic pressure of the high clutch 33.

By the above control, the hydraulic pressure of the high clutch 33 is kept when the increased amount of the engine rotation speed Ne is large, whereas the hydraulic pressure of the high clutch 33 is so controlled that the actual output torque T1out of the sub-transmission mechanism 30 monotonously increases with the predetermined upward gradient when the increased amount of the engine rotation speed Ne is small.

Referring back to FIG. 10, in Step S506, it is determined whether or not the instruction hydraulic pressure of the high clutch 33 has become zero. Step S507 follows if the instruction hydraulic pressure to the high clutch 33 is zero, whereas the control this time is finished unless the instruction hydraulic pressure to the high clutch 33 is zero.

In Step S507, the slip interlock release control is finished. The slip interlock release flag is reset to "0".

Figure 12:
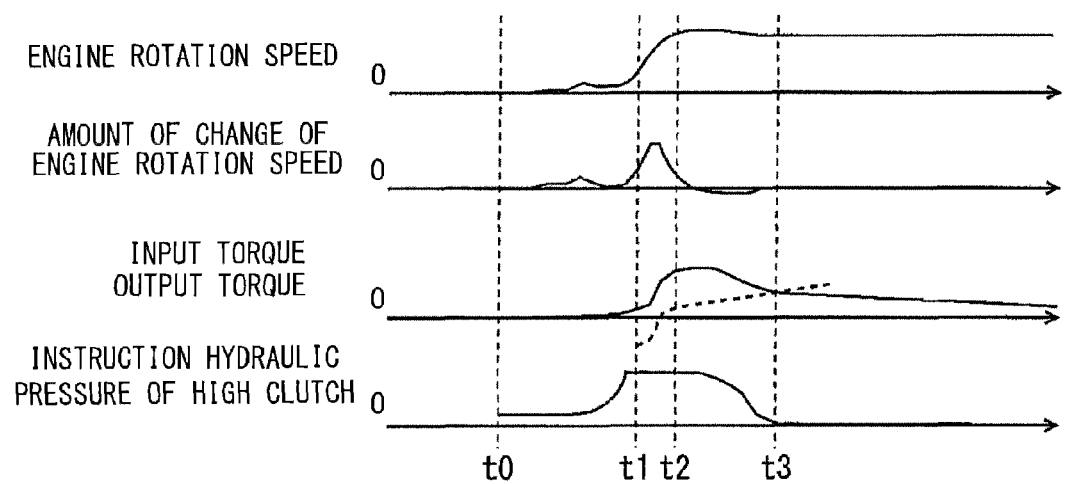
FIG. 12 is a time chart showing changes of an input torque and an output torque of a sub-transmission mechanism and the like in the third embodiment of the present invention.

Changes of the input torque T3 and the output torque T1out of the sub-transmission mechanism 30 and the like when the following return control from the idle stop control of this embodiment is executed are described using a time chart of FIG. 12. Note that the output torque T1out is shown by broken line.

The engine rotation speed Ne increases after a return from the idle stop control is determined at time t0.

When the engine rotation speed Ne becomes the start determining rotation speed at time t1, the slip interlock release control is started. Here, the slip interlock release control is started when the engine rotation speed Ne becomes the start determining rotation speed.

Since the engine 1 revs up and an increased amount of the engine rotation speed Ne per unit time is large immediately after the slip interlock start control is started, [input torque T3×B−(input torque T3×B)'] is larger than the fourth predetermined value. Thus, the target output torque T1$o$ increases as the input torque T3 increases as shown in Equation (7). However, a deviation between the input torque T3 to the sub-transmission mechanism 30 and the target output torque T1$o$ remains unchanged from the deviation in the last calculation. Thus, the target output torque T1$o$ changes according to the input torque T3 and the instruction hydraulic pressure of the high clutch 33 is kept at the initial hydraulic pressure. Note that although the output torque T1$o$ corresponding to a case where the input torque T3 is small is shown in FIG. 12 for illustrative purposes, the output torque T1$o$ to be actually output is zero when the input torque T3 is small.

When the increased amount of the engine rotation speed Ne per unit time is reduced at time t2, the fourth predetermined value becomes larger than [input torque T3×B−(input torque T3×B)']. Thus, the target output torque T1$o$ is calculated to monotonously increase as shown in Equation (9). Further, the instruction hydraulic pressure of the high clutch 33 is set to realize the target output torque T1$o$, and the instruction hydraulic pressure of the high clutch 33 decreases.

When the instruction hydraulic pressure of the high clutch 33 becomes zero at time t3, the slip interlock release control is finished.

Figure 13:
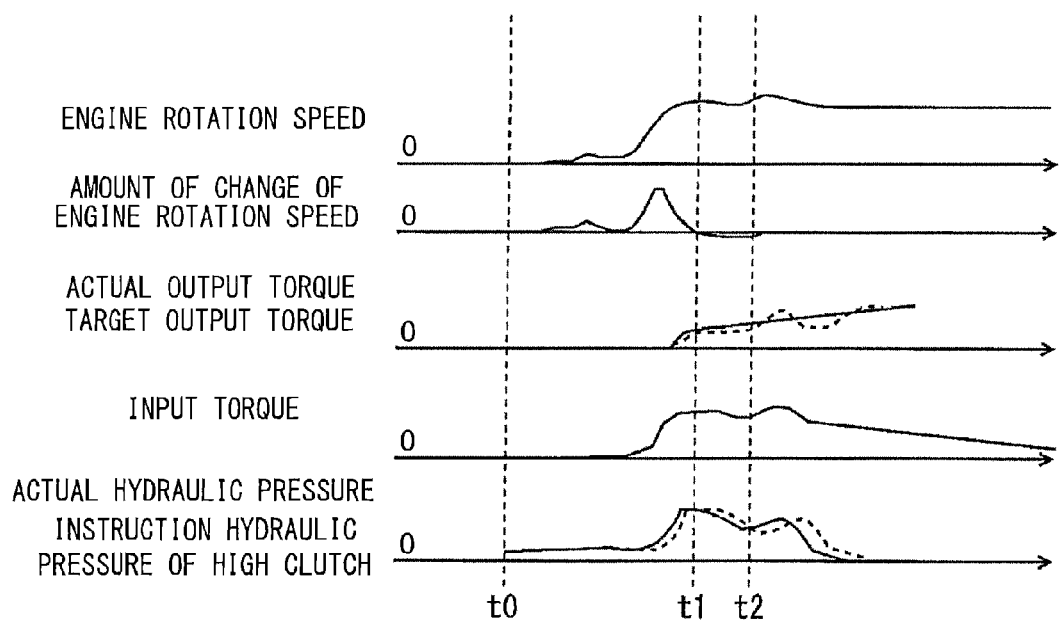
FIG. 13 is a time chart showing changes of the input torque and the output torque of the sub-transmission mechanism and the like when the third embodiment of the present invention is not used.
Figure 14:
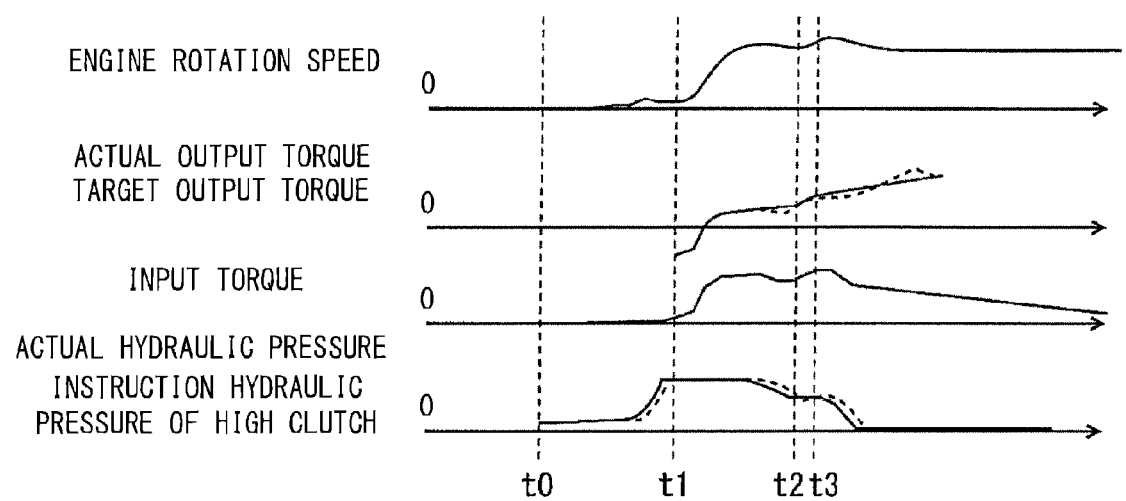
FIG. 14 is a time chart showing changes of the input torque and the output torque of the sub-transmission mechanism when the third embodiment of the present invention is used.

Further, changes of the input torque T3 and the output torque T1out of the sub-transmission mechanism 30 and the like when the engine rotation speed Ne varies and, for example, the engine rotation speed Ne peaks twice are described using time charts of FIGS. 13 and 14. FIG. 13 is a time chart when this embodiment is not used, but the second embodiment is used. FIG. 14 is a time chart when this embodiment is used. Here is described a case where a response of the hydraulic pressure supplied to the high clutch 33 is slow.

First, the case using the second embodiment is described. In FIG. 13, changes of the actual hydraulic pressure and the actual output torque T1out of the high clutch 33 are shown by broken line.

A return is made from the idle stop control at time t0.

When the slip interlock release control is started at time t1, the target output torque T1$o$ of the sub-transmission mechanism 30 is calculated to monotonously increase.

When the engine rotation speed Ne increases again at time t2, the instruction hydraulic pressure of the high clutch 33 also increases. Thus, the vehicle that is once started decelerates, wherefore a sense of incongruity is given to the driver.

If the response of the hydraulic pressure of the high clutch 33 is slow, the actual hydraulic pressure of the high clutch 33 does not increase when the engine rotation speed Ne increases. Thus, a pushed feeling caused by an increase of the engine rotation speed Ne becomes stronger. When the increase of the engine rotation speed Ne ends, the actual hydraulic pressure of the high clutch 33 increases. Thus, the actual output torque T1out of the high clutch 33 decreases and the vehicle decelerates. In this way, a change (amplitude) of the actual output torque T1out of the high clutch 33 becomes larger and a sense of incongruity given to the driver increases.

Note that since the instruction hydraulic pressure of the high clutch 33 decreases even if the engine rotation speed Ne increases again, for example, when the instruction hydraulic pressure of the high clutch 33 is monotonously decreased as in the first embodiment, the occurrence of a shock associated with the increase of the engine rotation speed Ne cannot be suppressed.

Next, the case using this embodiment (third embodiment) is described. Also in FIG. 14, changes of the actual hydraulic pressure and the actual output torque when the response of the hydraulic pressure is slow are shown by broken line.

A return is made from the idle stop control at time t0 and the slip interlock release control is started at time t1.

Since [input torque T3×B−(input torque T3×B)'] becomes larger than the fourth predetermined value when the engine rotation speed Ne increases again at time t2, the instruction hydraulic pressure of the high clutch 33 is kept at the instruction hydraulic pressure in the last calculation. Thus, the vehicle that is once started does not decelerate. Further, the change of the actual output torque T1out decreases and a sense of incongruity given to the driver can be reduced when the response of the hydraulic pressure is slow.

When the changed amount of the engine rotation speed Ne decreases and the fourth predetermined value becomes larger than [input torque T3×B−(input torque T3×B)'] at time t3, the target output torque T1o is calculated to monotonously increase and the instruction hydraulic pressure of the high clutch 33 decreases.

Since the instruction hydraulic pressure of the high clutch 33 is not increased in this embodiment, an amplitude change of the actual output torque T1out of the high clutch 33 can be reduced and a sense of incongruity given to the driver can be reduced even if the response of the hydraulic pressure is slow when the engine rotation speed Ne varies.

Effects of the third embodiment of the present invention are described.

The target output torque T1o is calculated by comparing the deviation between [(input torque T3×B)'] calculated this time and [(input torque T3×B)'] calculated last time with the fourth predetermined value. In this way, the slip interlock release control can be executed without accurately determining the end of the rev-up of the engine 1. For example, the slip interlock release control can be executed without making the determinations such as the one in Step S102 of the first embodiment.

If the deviation between [(input torque T3×B)'] calculated this time and [(input torque T3×B)'] calculated last time is larger than the fourth predetermined value, the instruction hydraulic pressure of the high clutch 33 is kept. If the fourth predetermined value is larger than the deviation between [(input torque T3×B)'] calculated this time and [(input torque T3×B)'] calculated last time, the instruction hydraulic pressure of the high clutch 33 is so set that the output torque T1out output from the sub-transmission mechanism 30 monotonously increases. In this way, the slip interlock release control can be executed without accurately determining the end of the rev-up of the engine 1. Further, since the instruction hydraulic pressure of the high clutch 33 is kept when the engine 1 revs up, for example, in two stages, the vehicle that has started does not decelerate and a sense of incongruity given to the driver can be reduced. Further, the change (amplitude) of the output torque T1out of the sub-transmission mechanism 30 can be reduced and a sense of incongruity given to the driver can be reduced when the response of the hydraulic pressure is slow.

By increasing the fourth predetermined value as the upward gradient increases, the slip interlock release control can be executed at an earlier timing. Thus, in the case of a return from the idle stop control, the output torque T1out of the sub-transmission mechanism 30 increases more quickly, wherefore it is possible to reduce a backward and downward slide of the vehicle and improve vehicle startability.

By increasing the fourth predetermined value as the upward gradient increases, the decreased amount of the hydraulic pressure of the high clutch 33 per unit time can be increased. Thus, in the case of a return from the idle stop control, the output torque T1out of the sub-transmission mechanism 30 increases more quickly, wherefore it is possible to reduce a backward and downward slide of the vehicle and improve vehicle startability.

Note that although the vehicle including the continuously variable transmission and the sub-transmission mechanism 30 has been described in the above embodiments, the vehicle is not limited to this. For example, a vehicle including a stepped transmission which includes no one-way clutch and has discrete gear positions to be shifted may be, for example, used.

Further, although the second predetermined value in the first embodiment and the like are set according to the gradient detected by the G sensor 47, the second predetermined value and the like may be set based on a gradient at startup of the vehicle or may be set at specified time intervals based on the gradient detected at specified time intervals after the startup.

The present invention is not limited to the embodiments described above and obviously includes various modifications and improvements which can be made within the scope of the technical concept thereof.

This application claims priority from Japanese Patent Application No. 2010-52374, filed Mar. 9, 2010, which is incorporated herein by reference in its entirety.

The invention claimed is:

1. A control device to control a stepped transmission mechanism of a transmission, the stepped transmission mechanism including a first clutch to be engaged at startup and a second clutch that differs from the first clutch, and is interlocked when a hydraulic pressure is supplied to the first clutch and the second clutch and the first and second clutches are completely engaged, comprising:
a hydraulic pressure control unit configured to control a hydraulic pressure supplied to the stepped transmission mechanism such that the first clutch is set in a completely engaged state and the second clutch is set in a slip interlock state where the second clutch is not completely engaged in a case of a return from an idle stop control in which an engine is automatically stopped,
wherein the hydraulic pressure control unit is configured to start reducing the hydraulic pressure supplied to the second clutch when an increased amount of an engine rotation speed per unit time becomes smaller than a predetermined increased value,
wherein the predetermined increased value is a value at which a rev-up of the engine, in which the increased amount of the engine rotation speed per unit time is positive, can be determined to end, and
wherein the first and second clutches are completely engaged during interlock of the stepped transmission mechanism.

2. The control device of claim 1, wherein the hydraulic pressure control unit is configured to control the hydraulic pressure supplied to the second clutch such that a decreased amount of the hydraulic pressure supplied to the second clutch per unit time becomes a predetermined decreased value.

3. The control device of claim 1,
wherein the hydraulic pressure control unit includes a target output torque calculation unit configured to calculate a target output torque by adding a predetermined torque value to a target output torque calculated previously; and
wherein the hydraulic pressure control unit is configured to control the hydraulic pressure supplied to the second clutch based on the target output torque calculated by the target output torque calculation unit.

4. The control device of claim 1, further comprising:
a gradient detection unit configured to detect a gradient of a road surface in a travelling direction of a vehicle, wherein an initial hydraulic pressure increases as an upward gradient of the road surface in the travelling direction of the vehicle increases.

5. The control device of claim 1, further comprising:
a gradient detection unit configured to detect a gradient of a road surface in a travelling direction of a vehicle,
wherein the hydraulic pressure control unit is configured to cause the hydraulic pressure supplied to the second clutch to be reduced from an initial hydraulic pressure at an earlier timing as an upward gradient of the road surface in the travelling direction of the vehicle increases.

6. The control device of claim 1, further comprising:
a gradient detection unit configured to detect a gradient of a road surface in a travelling direction of a vehicle, wherein:
the hydraulic pressure control unit is configured to reduce a decreased amount of the hydraulic pressure supplied to the second clutch per unit time as an upward gradient of the road surface in the travelling direction of the vehicle increases.

7. The control device of claim 1, wherein the hydraulic pressure control unit is configured to start a supply of the hydraulic pressure to the second clutch such that the second clutch is set in the slip interlock state when a vehicle stops.

8. The control device of claim 1, wherein the idle stop control is started after the second clutch is set in the slip interlock state.

9. A control device to control a stepped transmission mechanism of a transmission, the stepped transmission mechanism including a first clutch to be engaged at startup and a second clutch that differs from the first clutch, and is interlocked when a hydraulic pressure is supplied to the first clutch and the second clutch and the first and second clutches are completely engaged, comprising:
a hydraulic pressure control unit configured to control a hydraulic pressure supplied to the stepped transmission mechanism such that the first clutch is set in a completely engaged state and the second clutch is set in a slip interlock state where the second clutch is not completely engaged in a case of a return from an idle stop control in which an engine is automatically stopped,
wherein the hydraulic pressure control unit includes a target output torque calculation unit configured to calculate a target output torque by adding a predetermined torque value to a target output torque calculated previously, and
wherein the hydraulic pressure control unit is configured to control the hydraulic pressure supplied to the second clutch based on the target output torque calculated by the target output torque calculation unit.

10. A control device to control a stepped transmission mechanism of a transmission, the stepped transmission mechanism including a first clutch to be engaged at startup and a second clutch that differs from the first clutch, and is interlocked when a hydraulic pressure is supplied to the first clutch and the second clutch and the first and second clutches are completely engaged, comprising:
a hydraulic pressure control unit configured to control a hydraulic pressure supplied to the stepped transmission mechanism such that the first clutch is set in a completely engaged state and the second clutch is set in a slip interlock state where the second clutch is not completely engaged in a case of a return from an idle stop control in which an engine is automatically stopped,
wherein the hydraulic pressure control unit includes a target output torque calculation unit configured to
calculate an input torque of the stepped transmission mechanism based on an engine rotation speed, and
calculates calculate a target output torque of the stepped transmission mechanism based on a deviation between the input torque of the stepped transmission mechanism currently calculated and an input torque of the stepped transmission mechanism calculated previously and a predetermined increased torque value, and
wherein the hydraulic pressure control unit is configured to control the hydraulic pressure supplied to the second clutch based on the target output torque calculated by the target output torque calculation unit.

11. The control device of claim 10, wherein the target output torque control unit is configured to calculate the target output torque by adding the deviation to a target output torque calculated previously when the deviation is larger than the predetermined increased torque value or by adding the predetermined increased torque value to the target output torque calculated previously when the deviation is smaller than the predetermined increased torque value.

12. A method of controlling a stepped transmission mechanism which includes a first clutch to be engaged at startup and a second clutch that differs from the first clutch, and is interlocked when a hydraulic pressure is supplied to the first clutch and the second clutch and the first and second clutches are completely engaged, comprising:
starting reduction of the hydraulic pressure supplied to the second clutch when an increased amount of an engine rotation speed per unit time becomes smaller than a predetermined increased value such that the first clutch is set in a completely engaged state and the second clutch is set in a slip interlock state where the second clutch is not completely engaged in a case of a return from an idle stop control in which the engine is automatically stopped,
wherein the predetermined increased value is a value at which a rev-up of an engine, in which the increased amount of the engine rotation speed per unit time is positive, can be determined to end, and
wherein the first and second clutches are completely engaged during interlock of the stepped transmission mechanism.

* * * * *